(12) United States Patent
Minami (10) Patent No.: US 8,210,604 B2
(45) Date of Patent: Jul. 3, 2012

(54) VEHICLE DOOR STRUCTURE

(75) Inventor: Motoki Minami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 92 days.

(21) Appl. No.: 12/795,617

(22) Filed: Jun. 7, 2010

(65) Prior Publication Data

US 2011/0010996 A1    Jan. 20, 2011

(30) Foreign Application Priority Data

Jul. 14, 2009  (JP) ................ 2009-165767

(51) Int. Cl.
  *B62D 25/10*  (2006.01)
  *B60J 5/10*  (2006.01)
  *B60S 1/58*  (2006.01)
(52) U.S. Cl. ..... 296/208; 296/146.8; 296/56; 296/96.15
(58) Field of Classification Search .............. 296/56, 296/146.1, 146.2, 152, 154, 146.8, 208, 96.15, 296/146.5, 146.6; 15/250.01; 49/502
  See application file for complete search history.

(56) References Cited

U.S. PATENT DOCUMENTS

| | | | | |
|---|---|---|---|---|
| 5,799,358 | A * | 9/1998 | Unverrich | 15/250.01 |
| 6,131,991 | A * | 10/2000 | Sugitani | 296/208 |
| 6,189,961 | B1 * | 2/2001 | Poliskie et al. | 296/213 |
| 6,312,046 | B1 * | 11/2001 | Sora et al. | 296/208 |
| 6,431,642 | B2 * | 8/2002 | Sora et al. | 296/208 |
| 7,618,083 | B2 * | 11/2009 | Munenaga et al. | 296/146.6 |
| 2004/0117937 | A1 * | 6/2004 | Maruyama et al. | 15/250.02 |
| 2010/0230991 | A1 * | 9/2010 | Fioravanti | 296/96.15 |

FOREIGN PATENT DOCUMENTS

| | | | |
|---|---|---|---|
| FR | 2681033 | * | 3/1993 |
| JP | 62-20362 | | 1/1981 |
| JP | 62-020362 Y2 | | 1/1981 |
| JP | 62-20362 Y2 | | 1/1981 |
| JP | 60-174621 U | | 11/1985 |
| JP | 61-5223 | | 1/1986 |
| JP | 2006-260877 | | 9/2006 |
| JP | 2010-058628 | | 3/2010 |

OTHER PUBLICATIONS

Japanese Office Action for corresponding JP Application No. 2009-165767, Apr. 19, 2011.
Japanese Office Action for corresponding JP Application No. 2009-165767, Jul. 12, 2011.
Chinese Office Action for corresponding CN Application No. 201010198557.2, Jan. 31, 2012.

* cited by examiner

*Primary Examiner* — Glenn Dayoan
*Assistant Examiner* — Gregory Blankenship
(74) *Attorney, Agent, or Firm* — Ditthavong Mori & Steiner, P.C.

(57) ABSTRACT

A vehicle door structure includes a door body, a window panel, and a washer hose. The door body is attached to a door opening of a vehicle such that the door body can be opened and closed. The window panel is attached to an outer surface of the door body such that a window opening of the door body is covered. The window panel includes an opaque portion that does not allow viewing therethrough at a peripheral region of the window panel. Through the washer hose, washer fluid is supplied. The washer hose is disposed between the outer surface of the door body and the opaque portion.

16 Claims, 8 Drawing Sheets

VEHICLE DOOR STRUCTURE

CROSS REFERENCES TO RELATED APPLICATIONS

The present application claims priority under 35 U.S.C. §119 to Japanese Patent Application No. 2009-165767, filed in the Japan Patent Office on Jul. 14, 2009, entitled "VEHICLE DOOR STRUCTURE". The contents of this application are incorporated herein by reference in their entirety.

BACKGROUND OF THE INVENTION

1. Field of the Invention

The present invention relates to a vehicle door structure.

2. Description of the Related Art

For example, a vehicle door structure is known in which a washer hose that supplies washer fluid is incorporated in a back door. In a vehicle door structure of this type, a back door is attached to a rear opening of a vehicle body such that the back door can be opened and closed. Therefore, when a rear windshield wiper is to be attached to the back door, it is necessary that a washer hose be routed along the back door. Examples of such a vehicle door structure include one in which a washer hose is placed inside a door frame of a back door, and another in which a washer hose is routed near hinges for a back door (see, e.g., Japanese Examined Utility Model Registration Application Publication No. 62-20362 and Japanese Unexamined Utility Model Registration Application Publication No. 61-5223).

In the vehicle door structure disclosed in Japanese Examined Utility Model Registration Application Publication No. 62-20362, an upper end of a rear pillar has a first through hole from which a washer hose is pulled out, and a door frame of a back door has a second through hole from which the washer hose is inserted into an internal space of the door frame.

In the vehicle door structure disclosed in Japanese Unexamined Utility Model Registration Application Publication No. 61-5223, a back door is attached to a door opening via hinges such that the back door can be opened and closed, and a washer hose is held by the back door side of the hinges.

In the vehicle door structure disclosed in Japanese Examined Utility Model Registration Application Publication No. 62-20362, the washer hose is routed through the internal space of the door frame. Since this involves routing the washer hose through an area which is not visible, the workability in attaching the washer hose to the back door is poor.

In the vehicle door structure disclosed in Japanese Unexamined Utility Model Registration Application Publication No. 61-5223, the washer hose is placed along the inside of the back door. Since the washer hose is exposed when the back door is opened, the appearance of this part is adversely affected.

SUMMARY OF THE INVENTION

According to one aspect of the present invention, a vehicle door structure includes a door body, a window panel, and a washer hose through which washer fluid is supplied. The door body is attached to a door opening of a vehicle such that the door body can be opened and closed. The window panel is attached to an outer surface of the door body such that a window opening of the door body is covered. The window panel includes an opaque portion that does not allow viewing therethrough at a peripheral region of the window panel. Through the washer hose, washer fluid is supplied. The washer hose is disposed between the outer surface of the door body and the opaque portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Embodiments of the present invention will now be described with reference to the attached drawings. Note that the drawings are to be viewed in the direction of orientation of reference numerals.

Figure 1:
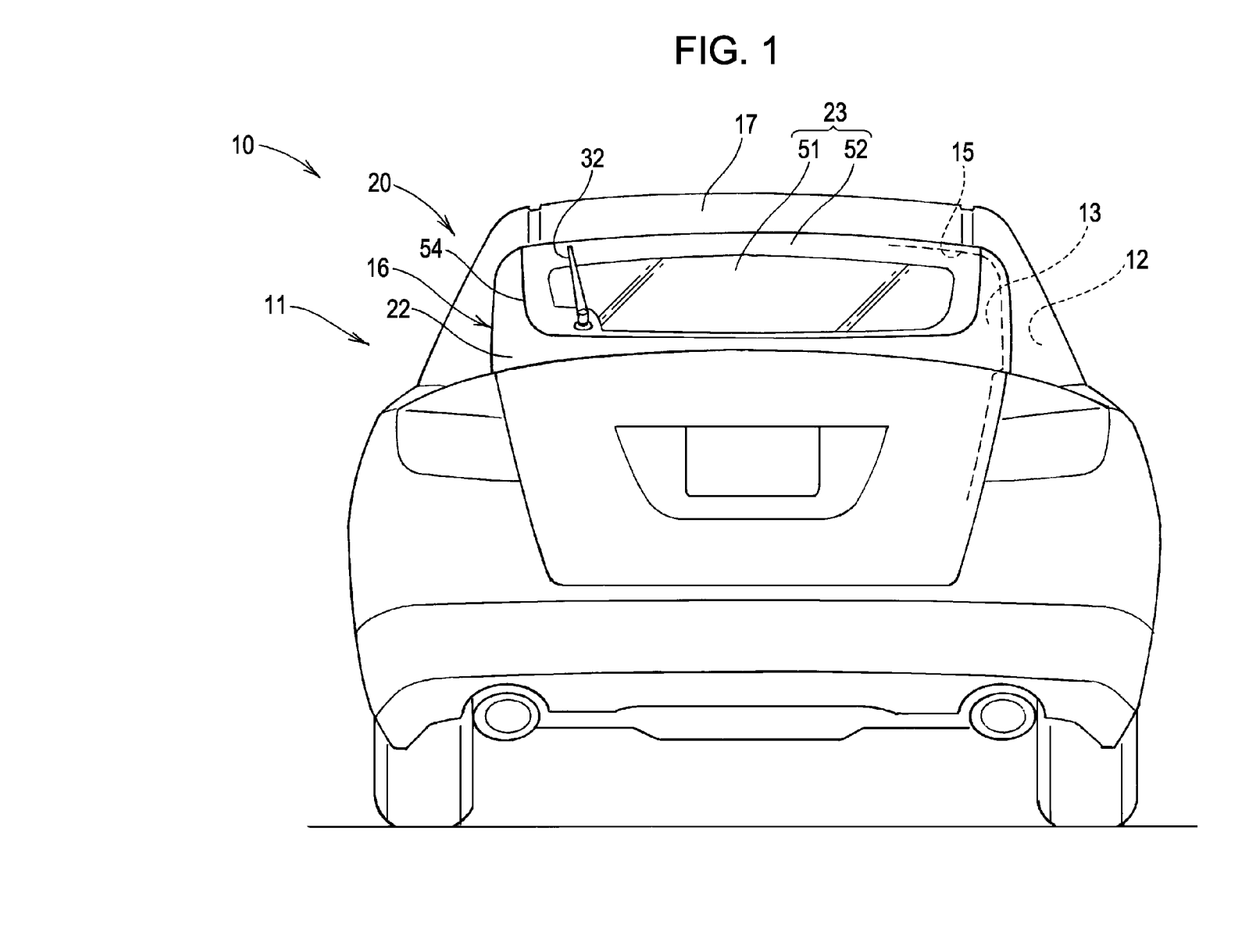
FIG. 1 is a rear view of a vehicle having a vehicle door structure according to an embodiment of the present invention.
Figure 2:
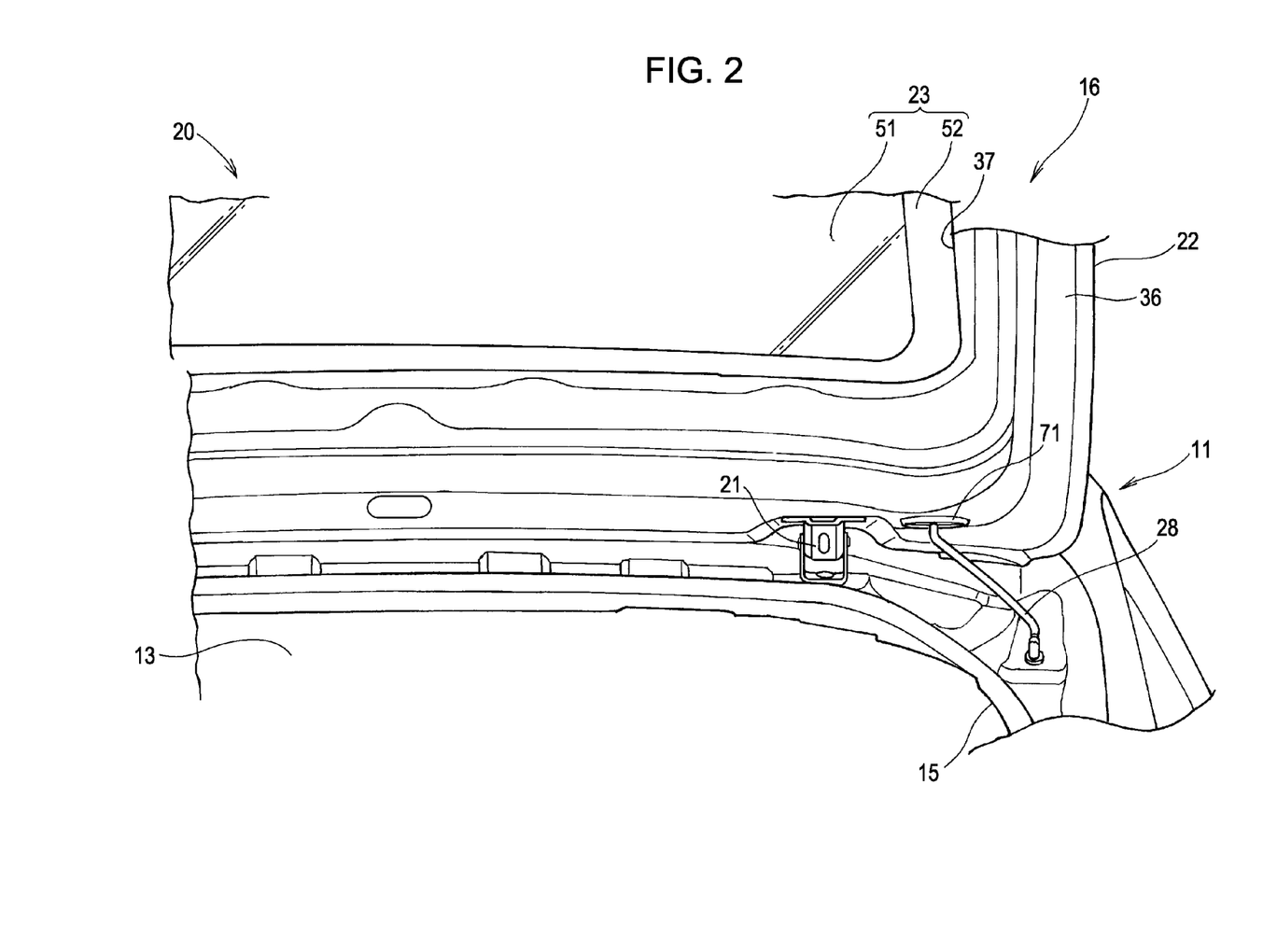
FIG. 2 is a rear view of the vehicle door structure illustrated in FIG. 1.
Figure 3:
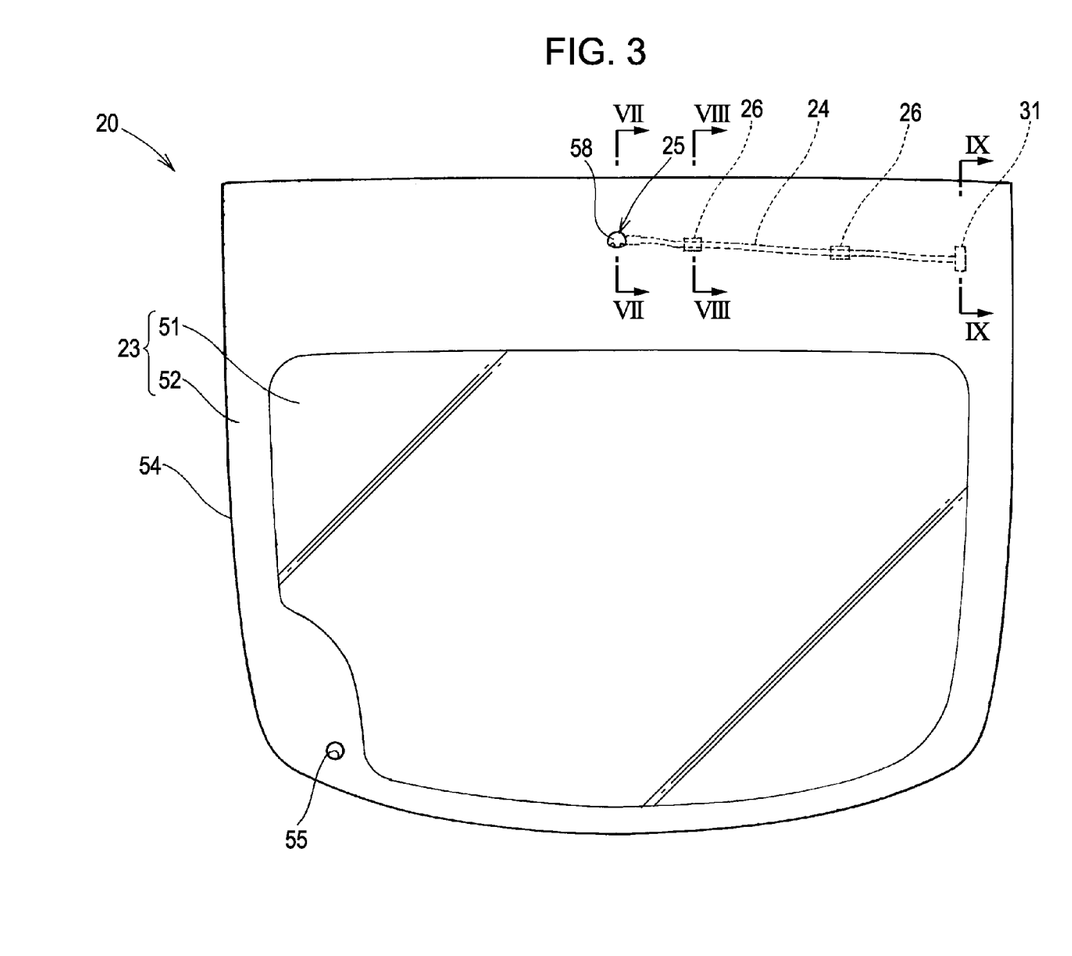
FIG. 3 is a plan view of the vehicle door structure illustrated in FIG. 2.

As illustrated in FIG. 1 to FIG. 3, a vehicle 10 has a door opening 15 that is open at the rear of a vehicle body 11, a back door (tailgate) 16 that covers the door opening 15 and can be opened and closed, a trunk 13 that is a luggage space below the back door 16, a vehicle interior 12 that is an occupants' space in front of the trunk 13, and a roof 17 that extends over the vehicle interior 12.

The back door 16 includes a door body 22, a window panel 23, a washer hose 24, a washer nozzle 25, retainers 26 and 26, a joint 31, and a rear windshield wiper 32. The door body 22 is attached to the rear of the vehicle body 11 via hinges 21 and 21 (one of which is not shown) such that the door body 22 can be opened and closed. The window panel 23 is attached to the outer surface of the door body 22 such that a window opening 37 of the door body 22 is covered. The washer hose 24 is disposed between the door body 22 and the window panel 23 and supplies washer fluid. The washer nozzle 25 is provided in the window panel 23, connected to one end (first end) of the washer hose 24, and ejects washer fluid to the window panel 23. The retainers 26 and 26 are provided on the backside of the window panel 23 to hold the washer hose 24. The joint 31 is provided at the other end (second end) of the washer hose 24 and connected to a washer supply channel 28. The rear windshield wiper 32 is attached to the door body 22.

A vehicle door structure 20 is a structure in which the washer hose 24 is routed along the back door 16. Specifically, in the vehicle door structure 20, the washer hose 24 is disposed between the outer surface of the door body 22 and an opaque portion (masking portion) 52 (see FIG. 3) of the window panel 23.

The back door 16 extends continuously from the roof 17 in the front-rear direction of the vehicle 10. The door body 22 includes an outer panel 35 (see FIG. 7) and an inner panel 36. The outer surface of the door body 22 corresponds to the frontside of the outer panel 35.

As illustrated in FIG. 2 and FIG. 7 to FIG. 9, the door body 22 is provided with the window opening 37 described above, a nozzle-side through hole 38 that is located at a position opposite the washer nozzle 25 and extends through the door body 22 from one side adjacent to the vehicle interior 12 or the trunk 13 to the outer surface of the door body 22, openings 39 and 39 (one of which is not shown) located at positions opposite the respective retainers 26 and 26 that hold the washer hose 24, and a joint-side through hole 41 that allows insertion of a first joint portion (joint portion) 67 of the joint 31 and extends through the door body 22 from one side adjacent to the vehicle interior 12 or the trunk 13 to the outer surface of the door body 22.

The window opening 37 allows the driver to see rearward from the vehicle interior 12 through the window panel 23. The nozzle-side through hole 38 includes an upper hole 42 in the outer panel 35 and a lower hole 43 in the inner panel 36. The openings 39 and 39 are provided in the outer panel 35. The joint-side through hole 41 includes a joint hole 44 in the outer panel 35 and a grommet hole 45 in the inner panel 36. The joint hole 44 is a hole through which the first joint portion 67 passes. The grommet hole 45 is a hole into which a grommet 71 is fitted.

Figure 4:
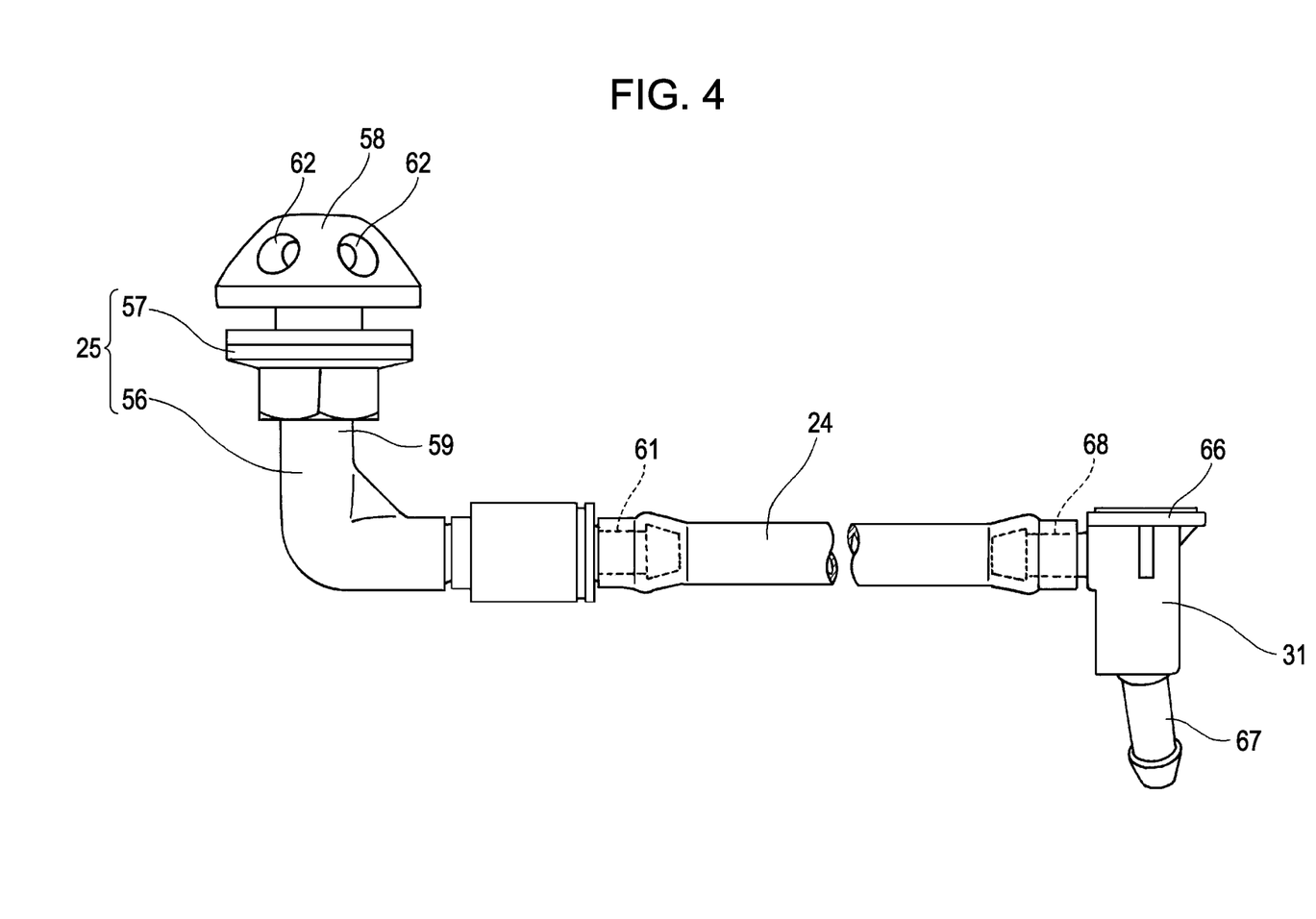
FIG. 4 is an assembly diagram of a washer nozzle and a washer hose that are in the vehicle door structure illustrated in FIG. 2.

As illustrated in FIG. 2 to FIG. 4, the window panel 23 has a transparent portion 51 that is formed along the window opening 37, the opaque portion 52 that is formed in an outer region 54 of the window panel 23 and does not allow viewing therethrough, a nozzle hole 53 (see FIG. 7) that is formed in the opaque portion 52 and faces the washer nozzle 25, and a wiper hole 55 that is formed in the opaque portion 52 and faces the rear windshield wiper 32 (see FIG. 1). The window panel 23 is a glass panel made of glass for use in vehicles.

The washer hose 24 extends in the vehicle width direction. The washer hose 24 is disposed between the outer surface of the door body 22 and the opaque portion 52 of the window panel 23, and is adjacent to the window panel 23. At the same time, the washer hose 24 is connected to the washer nozzle 25 at the first end, held by the retainers 26 and 26 in the middle, and connected to the joint 31 (more specifically, a second joint portion 68) at the second end.

Figure 7:
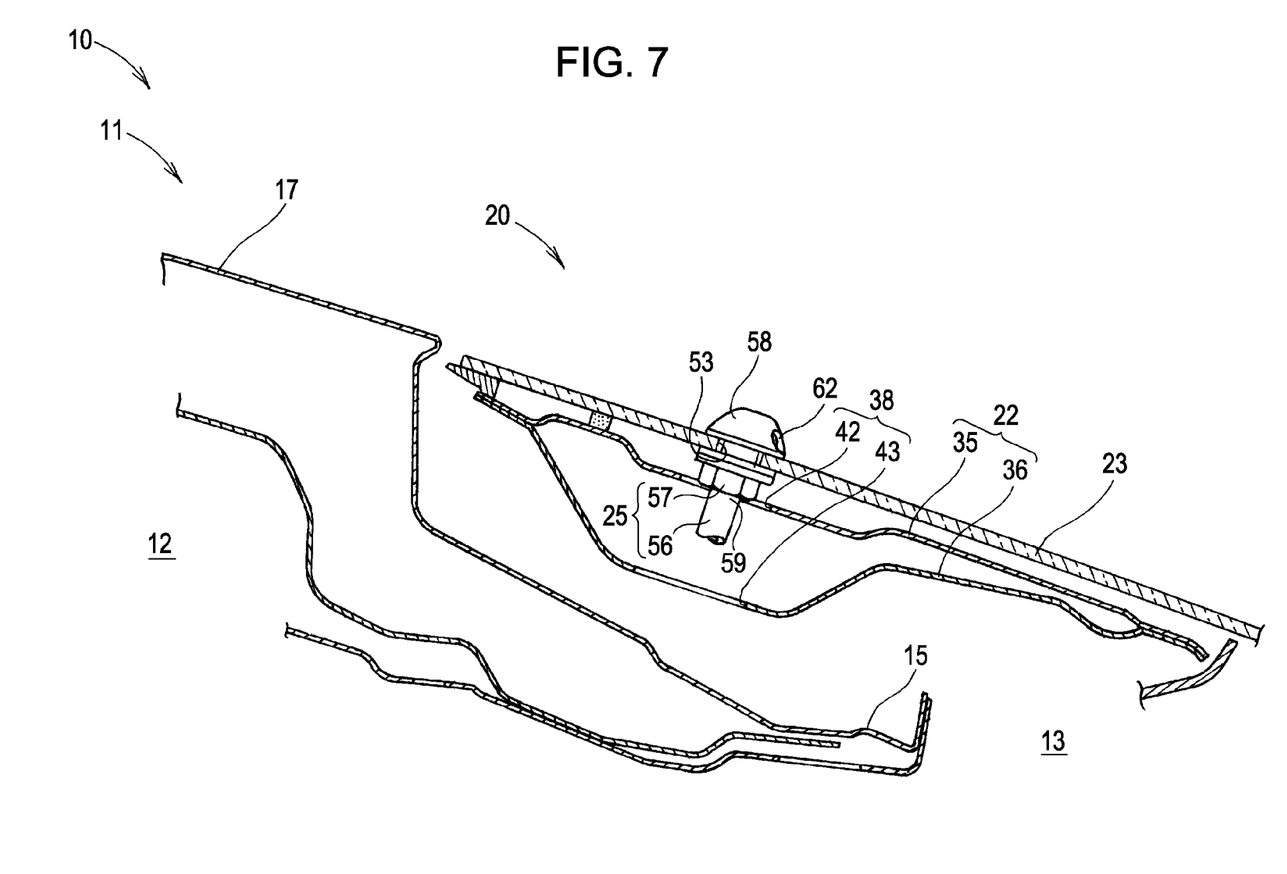
FIG. 7 is a cross-sectional view taken along line VII-VII of FIG. 3.

As illustrated in FIG. 4 and FIG. 7, the washer nozzle 25 includes a nozzle body 56 and a stopper 57 that secures the nozzle body 56 to the window panel 23. The nozzle body 56 includes a nozzle portion 58 that protrudes from the frontside of the window panel 23 to eject washer fluid therefrom, a stopper joint 59 that is provided on the backside of the window panel 23 and fitted into the stopper 57, and a hose connection portion 61 that extends in an L-shape from the stopper joint 59 and is connected to the first end of the washer hose 24. The nozzle portion 58 has a plurality of ejection holes 62 for ejecting washer fluid.

Figure 8:
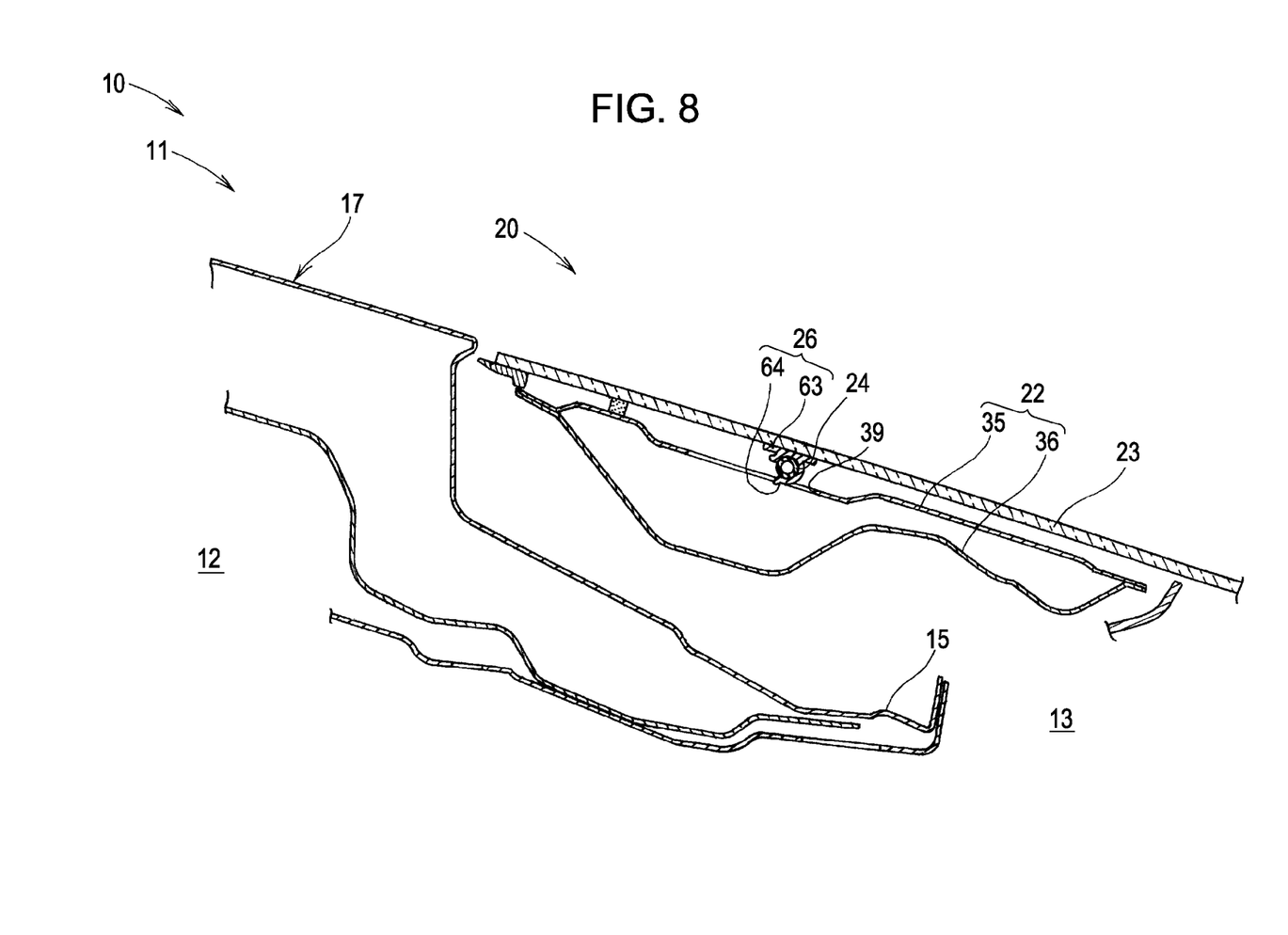
FIG. 8 is a cross-sectional view taken along line VIII-VIII of FIG. 3.

As illustrated in FIG. 3 and FIG. 8, the retainers 26 and 26 are attached to the backside of the opaque portion 52 of the window panel 23. Each retainer 26 includes a base portion 63 that is bonded to the opaque portion 52 and a hook portion 64 that is formed on the base portion 63 and into which the washer hose 24 is fitted.

Figure 5:
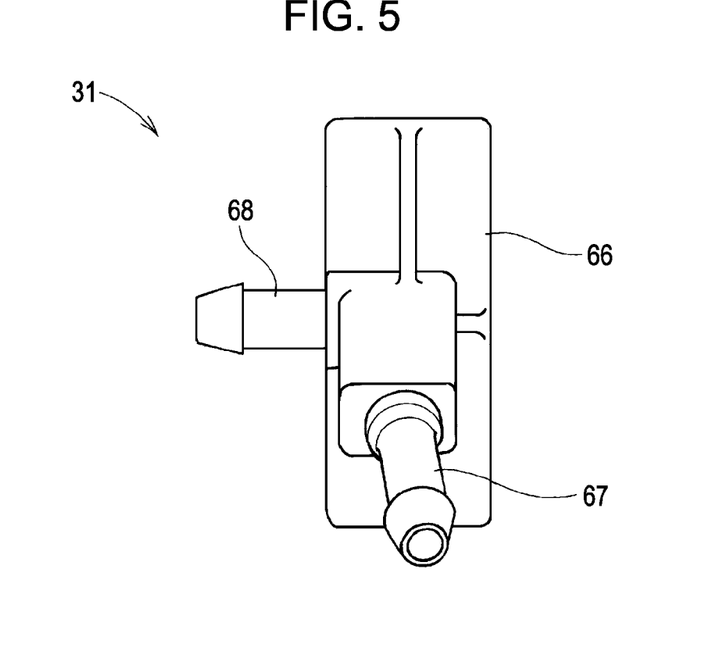
FIG. 5 is a bottom view of a joint in the vehicle door structure illustrated in FIG. 2.
Figure 6:
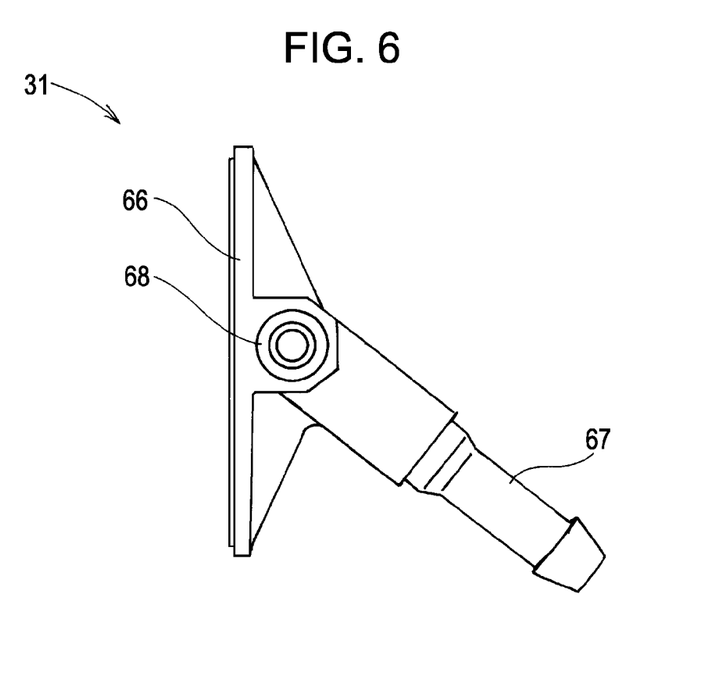
FIG. 6 is a side view of the joint in the vehicle door structure illustrated in FIG. 2.

As illustrated in FIG. 4 to FIG. 6, the joint 31 includes an attachment base 66 that is attached (or bonded) to the backside of the window panel 23 (see FIG. 9), the first joint portion 67 that protrudes from the attachment base 66 toward one side of the door body 22 adjacent to the vehicle interior 12 or the trunk 13 and is connected to the washer supply channel 28, and the second joint portion 68 that protrudes from the attachment base 66 toward the washer nozzle 25 (in the vehicle width direction) and is connected to the second end of the washer hose 24.

Figure 9:
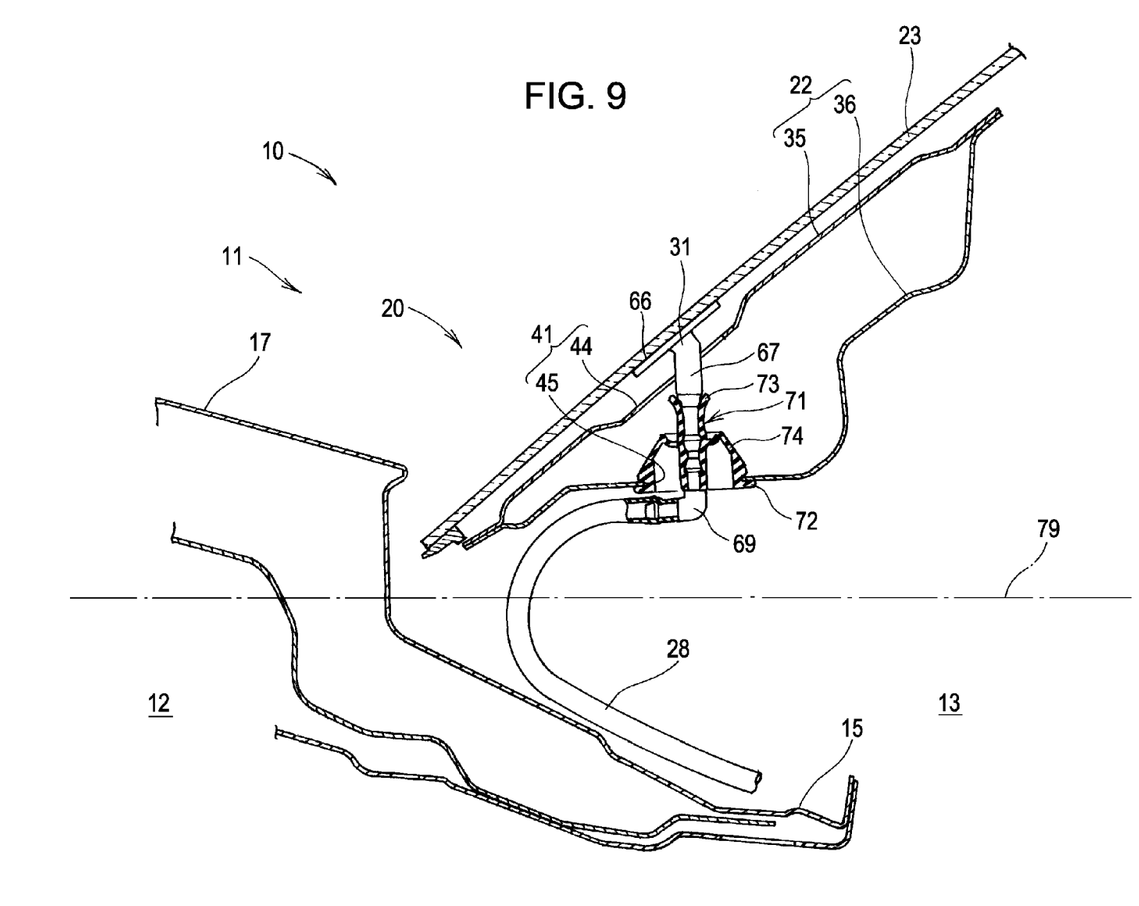
FIG. 9 is a cross-sectional view taken along line IX-IX of FIG. 3.

As illustrated in FIG. 9, the attachment base 66 is bonded to the backside of the window panel 23. The first joint portion 67 is oriented substantially perpendicularly to a vehicle-body horizontal plane 79 when the door body 22 is in an open state. The second joint portion 68 (see FIG. 4) is formed in the direction in which the washer hose 24 extends. The vehicle-body horizontal plane 79 refers to a plane horizontal to the ground, such as a floor of the vehicle body 11. The first joint portion 67 and an engaging channel 73 extend in the direction in which the grommet 71 is attached to the joint-side through hole 41. The washer supply channel 28 is a channel that connects the joint 31 to a washer tank (not shown). One end of the washer supply channel 28 is provided with the grommet 71, which is connected thereto through an L-shaped joint 69.

The grommet 71 covers the joint-side through hole 41 at one side adjacent to the vehicle interior 12 or the trunk 13. The grommet 71 includes an engaging flange 72 that engages with an edge of the grommet hole 45 (which is included in the joint-side through hole 41) adjacent to the vehicle interior 12 or the trunk 13, the engaging channel 73 that engages with the first joint portion 67 of the joint 31, and a connecting portion 74 that connects the engaging flange 72 to the engaging channel 73 and has flexibility. The washer supply channel 28 is connected to the joint 31 such that it can accommodate errors in connection. At the same time, the washer supply channel 28 is swingably supported by the door body 22.

The engaging channel 73 allows washer fluid to flow therethrough. The engaging channel 73 protrudes from the connecting portion 74 toward the window panel 23, and also toward the vehicle interior 12 or the trunk 13. When the door body 22 is in an open state, the engaging channel 73 is oriented substantially perpendicularly to the vehicle-body horizontal plane 79.

As illustrated in FIG. 1 to FIG. 3, the vehicle door structure 20 includes the door body 22 attached to the door opening 15 of the vehicle 10 such that the door body 22 can be opened and closed, and the window panel 23 attached to the outer surface of the door body 22 such that the window opening 37 of the door body 22 is covered. The opaque portion 52 that does not allow viewing therethrough is provided in the outer region 54 of the window panel 23.

The washer hose 24 that supplies washer fluid is disposed between the outer surface of the door body 22 and the opaque portion 52. Therefore, for example, the washer hose 24 can be attached to the window panel 23 or to the door body 22 before the window panel 23 is attached to the door body 22. This means that it is possible to avoid the operation of placing the washer hose 24 in a location which is not visible. In other words, it is possible to improve workability in placing the washer hose 24.

Since the washer hose 24 that supplies washer fluid is placed between the outer surface of the door body 22 and the opaque portion 52, the washer hose 24 can be hidden from outside after the window panel 23 is attached to the door body 22. This means that the appearance of the area around the washer hose 24 can be improved.

The washer hose 24 may be attached to the window panel 23. Generally, in the process of assembling the vehicle 10 (see FIG. 1), the window panel 23 and the washer hose 24 are attached to the door body 22 after completion of painting the body, including the door body 22. When the washer hose 24 is attached to the window panel 23, the washer hose 24 can be made integral with the window panel 23 in advance. Thus, since the window panel 23 and the washer hose 24 can be simultaneously attached to the door body 22, the workability in assembling the window panel 23 and the washer hose 24 can be improved.

In the vehicle door structure 20, as illustrated in FIG. 3 and FIG. 8, the window panel 23 may be provided with the retainers 26 and 26 that hold the washer hose 24, and the outer surface of the door body 22 may be provided with the openings 39 and 39 that are located at positions opposite the respective retainers 26 and 26. Thus, through the openings 39 and 39, the retainers 26 and 26 can be placed inwardly from the outer surface of the door body 22. This means that the window panel 23 and the outer surface of the door body 22 can be brought close to each other. It is thus possible to reduce the total thickness of the door body 22 and the window panel 23.

In the vehicle door structure 20, as illustrated in FIG. 7, the window panel 23 may be provided with the washer nozzle 25 that is connected to the washer hose 24 (see FIG. 3) and exposed on the outer surface of the window panel 23.

The nozzle-side through hole 38 that extends through the door body 22 from one side adjacent to the vehicle interior 12 or the trunk 13 to the outer surface of the door body 22 may be provided at a position opposite the washer nozzle 25. This makes it possible to remove the washer hose 24 from the washer nozzle 25, and thus to allow replacement of the washer hose 24. That is, it is possible to replace the washer hose 24 with a new one without having to remove the window panel 23 from the outer surface of the door body 22. For replacement of the washer hose 24, an old washer hose can be taken out after a new washer hose is connected to the old washer hose. The washer nozzle 25 is also replaceable. For example, for replacement of the washer nozzle 25 alone, the washer nozzle 25 can be taken out through the upper hole 42 in the outer panel 35 or through the lower hole 43 in the inner panel 36.

In the vehicle door structure 20, as illustrated in FIG. 9, the washer supply channel 28 may be provided with the grommet 71 that covers the joint-side through hole 41 at one side adjacent to the vehicle interior 12 or the trunk 13. The grommet 71 may include the engaging channel 73 that allows washer fluid to flow therethrough, engages with the first joint portion 67, and protrudes toward the window panel 23. Thus, attaching the grommet 71 to the joint-side through hole 41 readily allows connection between the first joint portion 67 and the washer supply channel 28.

As a result, it is possible not only to reduce the number of components, but also to improve workability in attaching the grommet 71 and the washer supply channel 28. Additionally, since the grommet 71 and the joint 31 directly engage with each other, the mounting rigidity of the grommet 71 can be improved.

The grommet 71 may include the engaging flange 72 that engages with the joint-side through hole 41, and the connecting portion 74 that connects the engaging flange 72 to the engaging channel 73 and has flexibility. Thus, even if there is an error in attaching the joint 31 or in processing the joint-side through hole 41, it is possible to reliably bring the engaging flange 72 into engagement with the joint-side through hole 41 (grommet hole 45) while allowing the engaging channel 73 to engage with the first joint portion 67.

When the door body 22 is in an open state, the first joint portion 67 and the engaging channel 73 are oriented substantially perpendicularly to the vehicle-body horizontal plane 79. Therefore, for example, when the door body 22 is opened, the grommet 71 can be easily attached to the joint-side through hole 41 and, at the same time, the first joint portion 67 and the engaging channel 73 can be easily brought into engagement. This means that it is possible to further improve the workability of the vehicle door structure 20. Additionally, since the first joint portion 67 and the engaging channel 73 may extend in the direction in which the grommet 71 is attached to the joint-side through hole 41, it is possible to bring the engaging channel 73 into engagement with the first joint portion 67 simultaneously with attaching the grommet 71.

In the vehicle door structure according to the above-described embodiments of the present invention, as illustrated in FIG. 3, the window panel 23 is a glass panel made of glass for use in vehicles. However, the window panel 23 is not limited to this, and may be a transparent plastic board.

In the vehicle door structure according to the above-described embodiments of the present invention, as illustrated in FIG. 9, the connecting portion 74 that connects the engaging flange 72 to the engaging channel 73 may be of any type as long as it has flexibility. For example, the connecting portion 74 may be a thin-walled member or an accordion member. Thus, it is possible to sufficiently accommodate errors in attaching the joint 31 and errors in processing the joint-side through hole 41.

The vehicle door structure according to the above-described embodiments of the present invention is suitable for application to passenger vehicles, such as sedans and wagons.

According to the above-described embodiments of the present invention, for example, the washer hose can be attached to the window panel or to the door body before the window panel is attached to the door body. This means that it is possible to avoid the operation of placing the washer hose in a location which is not visible. In other words, it is possible to improve workability in placing the washer hose. Moreover, since the washer hose that supplies washer fluid is placed between the outer surface of the door body and the opaque portion, the washer hose can be hidden from outside after the window panel is attached to the door body. This means that the appearance of the area around the washer hose can be improved.

In the vehicle door structure according to the above-described embodiments of the invention, the washer hose may be attached to the window panel. Generally, in the process of assembling the vehicle, the window panel and the washer hose are attached to the door body after completion of painting the body, including the door body. When the washer hose is attached to the window panel, the washer hose can be made integral with the window panel in advance. Thus, since the window panel and the washer hose can be simultaneously attached to the door body, the workability in assembling the window panel and the washer hose can be improved.

In the vehicle door structure according to the above-described embodiments of the invention, the window panel may be provided with retainers that hold the washer hose, and the outer surface of the door body may be provided with openings that are located at positions opposite the respective retainers. Thus, through the openings, the retainers can be placed inwardly from the outer surface of the door body. This means that the window panel and the outer surface of the door body can be brought close to each other. It is thus possible to reduce the total thickness of the door body and the window panel.

In the vehicle door structure according to the above-described embodiments of the invention, the window panel may be provided with a washer nozzle that is connected to the washer hose and exposed on an outer surface of the window panel. A nozzle-side through hole that extends through the door body from one side adjacent to a vehicle interior or a trunk to the outer surface of the door body may be provided at a position opposite the washer nozzle. This makes it possible to remove the washer hose from the washer nozzle, and thus to allow replacement of the washer hose. That is, it is possible to replace the washer hose with a new one without having to remove the window panel from the outer surface of the door body.

In the vehicle door structure according to the above-described embodiments of the invention, the washer hose may be provided with a joint that is connected to a washer supply channel adjacent to a vehicle body, the joint allowing washer fluid to be supplied therethrough. The joint may include an attachment base that is attached to the window panel, and a joint portion that protrudes from the attachment base to one side of the door body adjacent to a vehicle interior or a trunk and is connected to the washer supply channel. The door body may be provided with a joint-side through hole that allows insertion of the joint portion and extends through the door body from one side adjacent to the vehicle interior or the trunk to the outer surface of the door body. The washer supply channel may be provided with a grommet that covers the joint-side through hole at one side adjacent to the vehicle interior or the trunk. The grommet may include an engaging channel that allows washer fluid to flow therethrough, engages with the joint portion, and protrudes toward the window panel. Thus, attaching the grommet to the joint-side through hole readily allows connection between the joint portion and the washer supply channel. As a result, it is possible not only to reduce the number of components, but also to improve workability in attaching the grommet and the washer supply channel. Additionally, since the grommet and the joint directly engage with each other, the mounting rigidity of the grommet can be improved.

In the vehicle door structure according to the above-described embodiments of the invention, the grommet may include an engaging flange that engages with the joint-side through hole, and a connecting portion that connects the engaging flange to the engaging channel and has flexibility. Thus, even if there is an error in attaching the joint or in processing the joint-side through hole, it is possible to reliably bring the engaging flange into engagement with the joint-side through hole while allowing the engaging channel to engage with the joint portion.

In the vehicle door structure according to the above-described embodiments of the invention, the joint portion and the engaging channel may extend in a direction in which the grommet is attached to the joint-side through hole. It is thus possible to bring the engaging channel into engagement with the joint portion simultaneously with attaching the grommet.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle door structure comprising:
    a door body attached to a door opening of a vehicle such that the door body can be opened and closed;
    a window panel attached to an outer surface of the door body such that a window opening of the door body is covered, the window panel including an opaque portion that does not allow viewing therethrough at a peripheral region of the window panel; and
    a washer hose through which washer fluid is supplied and which is disposed between the outer surface of the door body and the opaque portion.

2. The vehicle door structure according to claim 1, wherein the washer hose is attached to the window panel.

3. The vehicle door structure according to claim 1,
    wherein the window panel comprises a retainer that holds the washer hose; and
    wherein the outer surface of the door body has an opening that is located at a position opposite the retainer.

4. The vehicle door structure according to claim 1,
    wherein the window panel comprises a washer nozzle that is connected to the washer hose and exposed on an outer surface of the window panel; and
    wherein a nozzle-side through hole that extends through the door body from one side adjacent to a vehicle interior or adjacent to a trunk to the outer surface of the door body is provided at a position opposite the washer nozzle.

5. The vehicle door structure according to claim 1,
    wherein the washer hose comprises a joint that is connected to a washer supply channel adjacent to a vehicle body and through which washer fluid is supplied;
    wherein the joint comprises
        an attachment base that is attached to the window panel, and
        a joint portion that protrudes from the attachment base to one side of the door body adjacent to a vehicle interior or adjacent to a trunk and that is connected to the washer supply channel;
    wherein the door body has a joint-side through hole through which the joint portion is inserted and that extends through the door body from one side adjacent to the vehicle interior or adjacent to the trunk to the outer surface of the door body; and
    wherein the washer supply channel comprises a grommet that covers the joint-side through hole at one side adjacent to the vehicle interior or adjacent to the trunk, the grommet comprising an engaging channel through which washer fluid flows and that engages with the joint portion and protrudes toward the window panel.

6. The vehicle door structure according to claim 5, wherein the grommet comprises
    an engaging flange that engages with the joint-side through hole, and
    a connecting portion that connects the engaging flange to the engaging channel and has flexibility.

7. The vehicle door structure according to claim 6, wherein the joint portion and the engaging channel extend in a direction in which the grommet is attached to the joint-side through hole.

8. The vehicle door structure according to claim 2,
    wherein the window panel comprises a retainer configured to hold the washer hose; and
    wherein the outer surface of the door body has an opening that is located at a position opposite the retainer.

9. The vehicle door structure according to claim 2,
    wherein the window panel comprises a washer nozzle that is connected to the washer hose and exposed on an outer surface of the window panel; and
    wherein a nozzle-side through hole that extends through the door body from one side adjacent to a vehicle interior or adjacent to a trunk to the outer surface of the door body is provided at a position opposite the washer nozzle.

10. The vehicle door structure according to claim 3,
wherein the window panel comprises a washer nozzle that is connected to the washer hose and exposed on an outer surface of the window panel; and
wherein a nozzle-side through hole that extends through the door body from one side adjacent to a vehicle interior or adjacent to a trunk to the outer surface of the door body is provided at a position opposite the washer nozzle.

11. The vehicle door structure according to claim 2,
wherein the washer hose comprises a joint that is connected to a washer supply channel adjacent to a vehicle body and through which washer fluid is supplied;
wherein the joint comprises
an attachment base that is attached to the window panel, and
a joint portion that protrudes from the attachment base to one side of the door body adjacent to a vehicle interior or adjacent to a trunk and that is connected to the washer supply channel;
wherein the door body has a joint-side through hole through which the joint portion is inserted and that extends through the door body from one side adjacent to the vehicle interior or adjacent to the trunk to the outer surface of the door body; and
wherein the washer supply channel comprises a grommet that covers the joint-side through hole at one side adjacent to the vehicle interior or adjacent to the trunk, the grommet comprising an engaging channel through which washer fluid flows and that engages with the joint portion and protrudes toward the window panel.

12. The vehicle door structure according to claim 3,
wherein the washer hose comprises a joint that is connected to a washer supply channel adjacent to a vehicle body and through which washer fluid is supplied;
wherein the joint comprises
an attachment base that is attached to the window panel, and
a joint portion that protrudes from the attachment base to one side of the door body adjacent to a vehicle interior or adjacent to a trunk and that is connected to the washer supply channel;
wherein the door body has a joint-side through hole through which the joint portion is inserted and that extends through the door body from one side adjacent to the vehicle interior or adjacent to the trunk to the outer surface of the door body; and
wherein the washer supply channel comprises a grommet that covers the joint-side through hole at one side adjacent to the vehicle interior or adjacent to the trunk, the grommet comprising an engaging channel through which washer fluid flows and that engages with the joint portion and protrudes toward the window panel.

13. The vehicle door structure according to claim 4,
wherein the washer hose comprises a joint that is connected to a washer supply channel adjacent to a vehicle body and through which washer fluid is supplied;
wherein the joint comprises
an attachment base that is attached to the window panel, and
a joint portion that protrudes from the attachment base to one side of the door body adjacent to the vehicle interior or adjacent to the trunk and that is connected to the washer supply channel;
wherein the door body has a joint-side through hole through which the joint portion is inserted and that extends through the door body from one side adjacent to the vehicle interior or adjacent to the trunk to the outer surface of the door body; and
wherein the washer supply channel comprises a grommet that covers the joint-side through hole at one side adjacent to the vehicle interior or adjacent to the trunk, the grommet comprising an engaging channel through which washer fluid flows and that engages with the joint portion and protrudes toward the window panel.

14. The vehicle door structure according to claim 8,
wherein the washer hose comprises a joint that is connected to a washer supply channel adjacent to a vehicle body and through which washer fluid is supplied;
wherein the joint comprises
an attachment base that is attached to the window panel, and
a joint portion that protrudes from the attachment base to one side of the door body adjacent to a vehicle interior or adjacent to a trunk and that is connected to the washer supply channel;
wherein the door body has a joint-side through hole through which the joint portion is inserted and that extends through the door body from one side adjacent to the vehicle interior or adjacent to the trunk to the outer surface of the door body; and
wherein the washer supply channel comprises a grommet that covers the joint-side through hole at one side adjacent to the vehicle interior or adjacent to the trunk, the grommet comprising an engaging channel through which washer fluid flows and that engages with the joint portion and protrudes toward the window panel.

15. The vehicle door structure according to claim 9,
wherein the washer hose comprises a joint that is connected to a washer supply channel adjacent to a vehicle body and through which washer fluid is supplied;
wherein the joint comprises
an attachment base that is attached to the window panel, and
a joint portion that protrudes from the attachment base to one side of the door body adjacent to the vehicle interior or adjacent to the trunk and that is connected to the washer supply channel;
wherein the door body has a joint-side through hole through which the joint portion is inserted and that extends through the door body from one side adjacent to the vehicle interior or adjacent to the trunk to the outer surface of the door body; and
wherein the washer supply channel comprises a grommet that covers the joint-side through hole at one side adjacent to the vehicle interior or adjacent to the trunk, the grommet comprising an engaging channel through which washer fluid flows and that engages with the joint portion and protrudes toward the window panel.

16. The vehicle door structure according to claim 10,
wherein the washer hose comprises a joint that is connected to a washer supply channel adjacent to a vehicle body and through which washer fluid is supplied;
wherein the joint comprises
an attachment base that is attached to the window panel, and
a joint portion that protrudes from the attachment base to one side of the door body adjacent to the vehicle interior or adjacent to the trunk and that is connected to the washer supply channel;
wherein the door body has a joint-side through hole through which the joint portion is inserted and that extends through the door body from one side adjacent to the vehicle interior or adjacent to the trunk to the outer surface of the door body; and wherein the washer supply channel comprises a grommet that covers the joint-side through hole at one side adjacent to the vehicle interior or adjacent to the trunk, the grommet comprising an engaging channel through which washer fluid flows and that engages with the joint portion and protrudes toward the window panel.

* * * * *